United States Patent [19]
Yokoyama et al.

[11] Patent Number: 5,385,794
[45] Date of Patent: Jan. 31, 1995

[54] CELL ELECTROLYTE SOLVENT, CELL ELECTROLYTE COMPRISING THE SOLVENT AND NON-AQUEOUS ELECTROLYTE BATTERY COMPRISING THE ELECTROLYTE

[75] Inventors: Keiichi Yokoyama; Akio Hiwara, both of Sodegaura; Shigeru Fujita, Tokyo; Atsuo Omaru, Koriyama, all of Japan

[73] Assignees: Mitsui Petrochemical Industries Ltd.; Sony Corp., both of Tokyo, Japan

[21] Appl. No.: 77,623

[22] Filed: Jun. 17, 1993

[30] Foreign Application Priority Data

Jun. 17, 1992 [JP] Japan .................................. 4-158337
Sep. 24, 1992 [JP] Japan .................................. 4-279446

[51] Int. Cl.⁶ ............................................ H01M 6/14
[52] U.S. Cl. ..................................... 429/194; 429/197
[58] Field of Search ......................... 429/197, 194

[56] References Cited

U.S. PATENT DOCUMENTS 3,686,038  8/1972  Garth .
3,817,916  3/1975  Kronenberg .
4,056,663  11/1977 Schlaikier ........................ 429/197
4,176,214  11/1979 Klinedinst et al. ............... 429/197
4,957,833  9/1990  Daifuku et al. ................... 429/197

FOREIGN PATENT DOCUMENTS 0129243  12/1984  European Pat. Off. .

Primary Examiner—Stephen Kalafut
Assistant Examiner—M. Nuzzolillo
Attorney, Agent, or Firm—Sherman and Shalloway

[57] ABSTRACT

Disclosed are a solvent for cell electrolyte comprising a carbamate represented by the following formula [1];

$$R^1O-\overset{O}{\underset{\|}{C}}-\underset{\underset{R^3}{|}}{N}-R^2 \quad [1]$$

wherein $R^1$, $R^2$ and $R^3$ independently represent a linear or branched alkyl group, cell electrolyte and non-aqueous electrolyte battery comprising the solvent. The solvent can provide batteries showing high withstand voltage and excellent charge/discharge efficiency.

19 Claims, 2 Drawing Sheets

CYCLE NUMBER

CELL ELECTROLYTE SOLVENT, CELL ELECTROLYTE COMPRISING THE SOLVENT AND NON-AQUEOUS ELECTROLYTE BATTERY COMPRISING THE ELECTROLYTE

BACKGROUND OF THE INVENTION

1. Field of the Invention

The present invention relates to a non-aqueous electrolyte for electric cells and a solvent for the electrolyte and particularly it relates to an electrolyte and a solvent for the electrolyte suitable for batteries, i.e., secondary cell or rechargable cell. The present invention further relates to a non-aqueous electrolyte battery utilizing lithium, more specifically, a non-aqueous electrolyte battery comprising a specific non-aqueous solvent where the use of the solvent prevents rapid heat generation and breakdown of the cell possibly caused by overcharge of the cell.

2. Prior Art

Recently, various kinds of portable electronic equipment such as camera-integrated VTR's, portable phones and lap-top computers have been developed and effort to make such equipment smaller and lighter is still being continued. For this reason, batteries have become paid much attention as a portable electric source for the portable electronic equipment and researches for providing batteries capable of realizing high energy density are conducted. In particular, lithium batteries are actively investigated because lithium batteries can provide higher energy density as compared with batteries using aqueous solution electrolyte such as lead batteries and nickel/cadmium cells.

Meanwhile, electric cells utilizing non-aqueous electrolyte have been conventionally and widely used as electric sources of various kinds of consumer electronic equipment because of their high voltage, high energy density and excellent properties relating to reliability of the cells such as storage characteristics and anti-leak property.

Conventional non-aqueous electrolytes usually comprise propylene carbonate and such electrolytes have been widely used for various primary cells including lithium cells because propylene carbonate is a good solvent for supporting salts and stable to alkali metals, and can show excellent discharging characteristics.

While batteries are of course required to show high energy density, excellent discharge characteristics and low self-discharge rate like primary cells, the batteries, in addition to the properties mentioned above, must satisfy the requirements that they show high energy efficiency upon charging and discharging (charge/discharge efficiency) and that the reversibility of the chemical and physical properties of the active materials are maintained upon repetition of charge/discharge cycles. The charge/discharge efficiency and the internal resistance of batteries are greatly influenced by the kind of electrolyte. For example, if electroconductivity of the electrolyte is high, the charge/discharge efficiency is improved and the internal resistance is lowered. Therefore, the electrolytes for batteries are required to have high electroconductivity, anti-redox properties, high withstand voltage and the like.

However, non-aqueous electrolytes generally have electroconductivity tens to hundreds times lower than aqueous solution electrolytes and, in particular, non-aqueous electrolytes having high withstand voltage generally show poor charge/discharge characteristics and insufficient internal resistance. For example, when propylene carbonate is used as the non-aqueous electrolyte for batteries, the charge/discharge efficiency (discharge capacity/charge capacity) is lowered to about 50 to 60%. Further, propylene carbonate cannot provide sufficient electroconductivity because it has high viscosity and hence low ion migration rate.

Although attempts to improve electric double layer conductivity of the cells by adding to propylene carbonate with cyclic ethers such as 1,3-dioxolans and tetrahydrofurans or linear chain ethers such as 1,2-dimethoxyethane (DME) and diethyl ether have been disclosed (e.g., DENKI KAGAKU (Electrochemistry) 53, No. 3, 173 (1985)), the addition of these ether compounds impairs the oxidation resistance of the solvent and then lowers the withstand voltage of the electrolyte.

Further, because of the high reactivity of metal lithium, metal lithium deposited in lithium cells during charge/discharge cycles may react with the solvent. For instance, N-methyl-2-oxazolidinone reacts with metal lithium and hence yellowed. Such reaction may badly affect the charge/discharge efficiency and life time of the cells.

Further, electric cells are generally manufactured in a sealed structure, but when the internal pressure of the cells are increased for some reason the cells may be broken and hence dysfunction. For instance, when non-aqueous electrolyte cells are overcharged by an electric current of larger electricity than expected, electrolyte and so on are decomposed to generate gas and the gas may elevate the internal pressure. Further, if such overcharge state lasts long, abnormal reactions such as rapid decomposition of the electrolyte and the active materials and rapid elevation of the cell temperature may be caused and they may invite breakdown of the cells.

To solve this problem, sealed cells of explosion proof type have been proposed. The cells of this type are provided with a current cut-off device or a pressure release device, which operates in response to the increase of the internal pressure of the cells. For example, if the internal pressure of the cells is elevated as a result of accumulation of gases generated by chemical reactions caused by long lasting overcharge state at inside of the cells, the current cut-off device operates to cut the charging current, or the pressure release device operates to release the internal pressure.

However, if the overcharge state is continued for long time in the conventional sealed cells of explosion proof type, the abnormal exothermic reactions often proceed even after the current cut-off device or the pressure release device has operated, and thus the cell temperature may elevate from 50° or 60° C. to 300° or 400° C. This rapid temperature elevation may cause rapid elevation of the internal pressure, which may lead breakdown of the cells, and is considered as a serious problem.

In view of the above-described problems, the object of the present invention is to provide a novel electrolyte and solvent for the electrolyte excellent in electroconductivity, no(less)-reactivity with alkali metals and withstand voltage. Another object of the present invention is to provide an electrolyte and a solvent for the electrolyte capable of providing batteries with excellent charge/discharge characteristics and stability.

Further, the present invention aims at preventing the abnormal exothermic reactions which may be observed even after the current cut-off device or the pressure release device has operated to prevent the rapid elevation of the cell temperature and the cell internal pressure, thereby breakdown of the cells is avoided.

SUMMARY OF THE INVENTION

According to the first aspect of the present invention, there is provided a solvent for cell electrolyte comprising a carbamate compound of the formula [1];

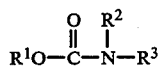

[1]

wherein $R^1$, $R^2$ and $R^3$ independently represent a linear or branched alkyl group, preferably, a lower alkyl group having 1 to 4 carbon atoms. The solvent may include a cyclic carbonate of the following formula [2];

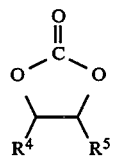

[2]

wherein $R^4$ and $R^5$ independently represent a substituent selected from the group consisting of a hydrogen atom, methyl group or ethyl group.

According to the second aspect of the invention, there is provided a cell electrolyte comprising, as an electrolyte solvent, a carbamate represented by the formula [1]. The solvent may include a cyclic carbonate of the formula [2]. The electrolyte comprises a solute electrolyte selected from the group consisting of $LiPF_6$, $LiBF_4$ and $LiClO_4$.

According to the third aspect of the invention, there is provided a non-aqueous electrolyte battery comprising a negative electrode capable of being reversibly doped with lithium, a positive electrode and a non-aqueous electrolyte formed by dissolving a solute electrolyte in a non-aqueous solvent, wherein the non-aqueous solvent comprises one or more carbamates represented by the formula [1] in an amount of from 0.05 to 20% by volume of the total volume of the non-aqueous solvent. The non-aqueous solvent may include at least one carbonate solvent compound. The positive electrode of the cell comprises $LixMO_2$ wherein M represents at least one transition metal and $0.05 \leq X \leq 1.10$.

DESCRIPTION OF PREFERRED EMBODIMENTS

Figure 1:
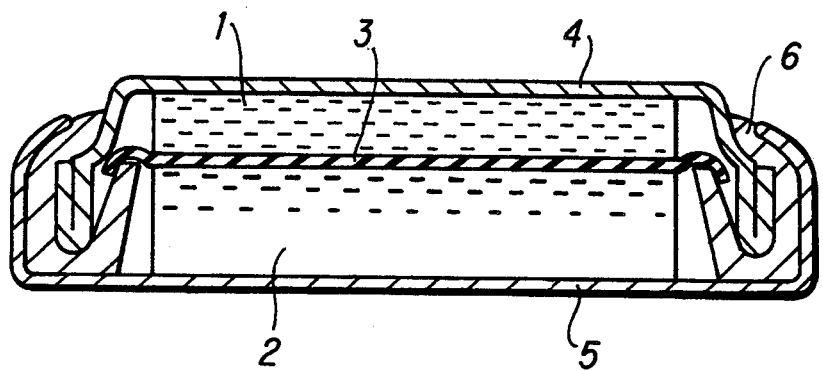
FIG. 1 shows an embodiment of the present invention, a coin-like shape cell utilizing the electrolyte according to the present invention.

The solvent for cell electrolyte of the present invention will be explained hereinafter. The solvent includes the carbamate of the formula [1];

[1]

wherein R1, R2 and R3 independently represent a linear or branched alkyl group, preferably, a lower alkyl group having 1 to 4 carbon atoms.

Examples of the carbamate namely alkyl N,N-dialkylcarbamate, include methyl N,N-dimethylcarbamate, methyl N,N-diethylcarbamate, ethyl N,N-dimethylcarbamate, ethyl N,N-diethylcarbamate, propyl N,N-dimethylcarbamate, propyl N,N-diethylcarbamate, propyl N,N-dipropylcarbamate, isopropyl N,N-dimethylcarbamate, isopropyl N,N-diethylcarbamate, iosopropyl N,N-diisopropylcarbamate, butyl N,N-dimethylcarbamate, butyl N,N-diethylcarbamate, butyl N,N-dipropylcarbamate and butyl N,N-diisopropylcarbamate. These carbamates may be used alone or in any combination. Among these carbamates, particularly preferred carbamates are methyl N,N-dimethylcarbamate, ethyl N,N-dimethylcarbamate, ethyl N,N-diethylcarbamate and propyl N,N-dimethylcarbamate.

The carbamates of the formula [1] have various advantages, for example, 1) they are solvents showing low viscosity and high dielectric constant, 2) they exhibit high withstand voltage, 3) they show relatively high electroconductivity when they dissolve solute electrolytes and 4) they may be used in a wide temperature range.

These carbamates may be used as a solvent for cell electrolyte by themselves or in combination with other non-aqueous solvents such as lactones, nitriles or the like. The non-aqueous solvents are not particularly limited. Examples of the non-aqueous solvent which may be used with the carbamates are propylene carbonate, ethylene carbonate, butylene carbonate, vinylene carbonate, γ-butylolactone, sulfolane, 1,2-dimethoxyethane, 1,2-diethoxyethane, 2-methyltetrahydrofuran, 3-methyl-1,3-dioxolan, methyl propionate, methyl butyrate, dimethyl carbonate, diethyl carbonate, dipropyl carbonate and the like.

From the view point of stability to voltage, the carbamates may be preferably used in combination with cyclic carbonates such as propylene carbonate, ethylene carbonate, butylene carbonate and vinylene carbonate, or linear carbonates such as dimethyl carbonate, diethyl carbonate and dipropyl carbonate, and particularly in combination with a cyclic carbonates of the following formula [2] as a mixed solvent;

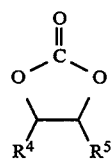

[2]

wherein R4 and R5 independently represent a substituent selected from the group consisting of a hydrogen atom, methyl group or ethyl group.

Examples of the cyclic carbonate of the formula [2] are ethylene carbonate, propylene carbonate, 2,3-butylene carbonate, 1,2-butylene carbonate, 2,3-amylene carbonate, 3,4-hexylene carbonate and the like. Among these cyclic carbonates, ethylene carbonate, propylene carbonate and 2,3-butylene carbonate are particularly preferred. These carbonates may be used alone or in any combination by mixing with the carbamate compounds.

By adding these cyclic carbonates to the solvent, it becomes possible to further improve the solubility of the solute electrolyte in the solvent. Therefore, a sufficiently high concentration of solute electrolyte can be obtained, thereby the electroconductivity and the charge/discharge efficiency can be much more improved.

When the carbamate of the formula [1] and the cyclic carbonate of the formula [2] are mixed, they are mixed usually in a volume ratio, though it is not particularly limited, preferably of from 1:9 to 8:2, more preferably, of from 2:8 to 6:4.

However, the ratio of the carbamate in the solvent differs depending upon kind of cells or conditions where the cell is used. It may be 100% (only carbamate) or less than 10% by volume when the other solvent is mixed. For example, when the carbamate is mixed with a non-aqueous solvent other than cyclic carbonates such as linear carbonates, even a slight amount, e.g. >0.02% of carbamates gives it's advantages to the solvent.

As described above, the solvent for cell electrolyte of the present invention may further contain, in addition to the above-described carbamates and the cyclic carbonates, any other non-aqueous solvents conventionally used as a solvent for cell electrolyte such as ethers and linear carbonates so long as the characteristics of the electrolyte are not deteriorated.

The cell electrolyte of the present invention is formed by dissolving a solute electrolyte in the electrolyte solvent comprising the carbamate of the formula [1]. Preferred examples of the solute electrolyte are alkali metal salts including lithium salts such as $LiPF_6$, $LiBF_4$, $LiClO_4$, $LiAsF_6$, $LiCF_3SO_3$, $LiAlCl_3$, $LiSiF_6$ and $LiN(CF_3SO_2)_2$. Among these solute electrolytes, particularly preferred are $LiPF_6$, $LiBF_4$ and $LiClO_4$.

The solute electrolyte is generally dissolved in the solvent in a concentration of from 0.1 to 3.0 mole/liter, preferably of from 0.5 to 2.0 mole/liter.

The electrolyte solvent and the electrolyte of the present invention may be used for both of primary cells and batteries. For example, they may be used for the batteries shown by FIGS. 1 and 3. The electrolyte solvent and electrolyte of the present invention are particularly suitable for batteries having a negative electrode of carbon or a metal comprising alkali metal and an active material of positive electrode capable of reversibly and electrochemically reacting with the alkali metal. For example, the electrolyte of the present invention may be used for lithium cells utilizing metal lithium as the negative electrode and a mixture of a lithium salt and graphite as the positive electrode.

As described above, the carbamates of the formula [1] are solvents showing low viscosity and high dielectric constant and, when they dissolve an electrolyte, they can give relatively high electroconductivity and high withstand voltage of the electrolyte. Therefore, batteries having excellent electroconductivity and withstand voltage can be obtained by utilizing the organic solvent comprising the carbamates as an organic electrolyte solvent for an electrolyte containing alkali metal salt dissolved in an organic electrolyte solvent.

Further, by adding the cyclic carbonates to the carbamates of the formula [1], the property of the solvent for dissolving the solute electrolyte is greatly improved and accordingly a sufficient concentration of the solute electrolyte can be obtained. As a result, the electroconductivity of the electrolyte and the charge/discharge efficiency of the cell can be improved.

The non-aqueous electrolyte batteries of the present invention will be explained hereinafter. The non-aqueous electrolyte battery of the present invention, one of the typical battery, comprises a negative electrode capable of being reversibly doped with lithium, a positive electrode and non-aqueous electrolyte formed by dissolving a solute electrolyte in a non-aqueous solvent, wherein the non-aqueous electrolyte comprises at least one of the above-described carbamates. The amount of the carbamate is not limited but it may be preferably more than 0.02%, more preferably from 0.02 to 80% by volume of the carbamates based on the total volume of the solvent. Under severe condition, the non-aqueous electrolyte preferably comprises more than 0.02 and less than 30%, more preferably 0.05 to 20% by volume of the carbamates based on the total volume of the carbamates and the other non-aqueous solvents.

The inventors achieved the present invention based on the finding that the abnormal exothermic reactions observed in the conventional cells even after the current cut-off device or the pressure release device has operated can be prevented by adding the alkyl N,N-dialkyl carbamates to the non-aqueous electrolyte, thereby the rapid temperature elevation and hence the breakdown of cells can be avoided.

As described above, the alkyl N,N-dialkylcarbamate(s) is added to the electrolyte in an amount of more than 0.02 and less than 30%, preferably from 0.05 to 20% by volume of the total volume of the alkyl N,N-dialkylcarbamate and other non-aqueous electrolyte solvents. In this range of the amount of the carbamate, the advantages of the adding the carbamate are sufficiently effected and the cell has long cell life time, that is, it stands practical application under severe condition, where the cell is continuously charged at a high temperature such as at 60° C. Under such condition, the speed of increasing the internal pressure of the conventional sealed cell becomes too high and hence the current cut-off device would operate within a short period of time.

In the cell of the present invention, the solute electrolyte to be dissolved in the non-aqueous solvent is not particularly limited and conventional electrolyte may be utilized. However, $LiClO_4$, $LiAsF_6$, $LiPF_6$, $LiBF_4$, $LiCF_3SO_3$, $LiN(CF_3SO_2)_2$ and the like can be mentioned as examples of the solute electrolyte. Among these, $LiPF_6$ and $LiBF_4$ are particularly preferred.

The positive electrode of the cell is not also particularly limited so long as it can make the cell possible to be charged and to discharge. For example, a positive electrode comprising an active material mainly containing $Li_xMO_2$, wherein M represents one or more transition metals and x satisfies $0.05 \leq x \leq 1.10$, may be preferably used. In this case, it is preferred that at least one of Co, Ni and Mn is used as the transition metal of M, thereby the energy density of the cell is improved.

As the negative electrode, a material capable of being reversibly doped with lithium is preferably selected. Examples of the material for the negative electrode are pyrolyzed carbonaceous substances, cokes such as pitch coke, needle coke and petroleum coke, graphite, glassy carbons, sintered materials formed by sintering polymer compounds such as phenol resins and furan resins at a suitable temperature, carbon fibers, other carbonaceous materials such as active carbon. Other materials usable for the negative electrode are metal lithium, lithium alloys such as lithium/aluminum alloys, polymers such as polyacetylene and polypyrrole and the like. Among these materials, carbonaceous materials capable of being reversibly doped with lithium are particularly preferred because such materials can improve the charge/discharge cycle efficiency of the cell.

Shape of the cell is not also particularly limited. The cell may be formed in various shapes such as a cylindrical shape, square pillar shape, coin-like shape and button-like shape. Further, the cell is preferably provided with a current cut-off device or a pressure releasing device which can operate depending on the internal pressure of the cells. The current cut-off device and the pressure releasing device may be the same as the devices provided in the conventional cells.

In the non-aqueous electrolyte battery of the present invention, the abnormal exothermic reaction, which is observed in the conventional batteries even after the current cut-off device or the pressure releasing device has operated, is prevented by the addition of the alkyl N,N-dlalkylcarbamate(s) to the non-aqueous electrolyte. Therefore, it is prevented the rapid elevation of the internal pressure of the cell after the current cut-off device or the pressure releasing device has started to operate and hence breakdown of the cell is avoided.

Yet it is unclear how the alkyl N,N-dialkylcarbamate restricts the abnormal exothermic reaction, but the mechanism may be presumed as follows. That is, it is considered that the abnormal exothermic reaction observed in the conventional cells even after the current cut-off device or the pressure releasing device has started to operate is caused by the overcharge state lasting for a certain period involving the cell active materials. However, if the alkyl N,N-dialkylcarbamate(s) is added to the non-aqueous electrolyte, the carbamate is preferentially decomposed electrochemically by the overcharge state to hasten the current cut-off device or the pressure releasing device to start to operate to eliminate the overcharge state, thereby the abnormal exothermic reaction observed in the conventional cells even after the current cut-off device or the pressure releasing device has started to operate is prevented.

EXAMPLES

The present invention will be further explained by referring to the following working examples, but the present invention is no way limited to these examples.

All of the alkyl N,N-dialkylcarbamates of the formula [1] used in the following examples were synthesized by the reaction of corresponding N,N-dialkylamines and chlorocarbonate esters and purified by distillation in the presence of calcium hydride. The prepared alkyl N,N-dialkylcarbamates and the physicochemical properties thereof are listed in Table 1 below.

TABLE 1

| The physical properties of the carbamates | | | |
|---|---|---|---|
| compound | boiling point (°C.) | relative dielectric constant | viscosity (cP, 25° C.) |
| methyl N,N-dimethyl carbamate | 131–133 | 12.5 | 0.8 |
| ethyl N,N-diethyl carbamate | 145–146 | 11.0 | 0.9 |
| methyl N,N-diethyl carbamate | 157–158 | 10.3 | 1.2 |

As seen from Table 1, the carbamates used in the present invention as a solvent for electrolyte have a relatively high boiling point and therefore they can be used in a wide temperature range. Further, because the carbamates have a low viscosity and a high dielectric constant, the electrolyte comprising these carbamates dissolved therein have a high electroconductivity.

Example 1

In a mixed solvent comprising methyl N,N-dimethylcarbamate and propylene carbonate in a volume ratio of 1:1, 3.8 g (25 mmol of lithium phosphate hexafluoride ($LiPF_6$) was dissolved to obtain 25 ml of electrolyte. The electroconductivity of this electrolyte was determined by an impedance meter at 10 kHz. The withstand voltage of the electrolyte was also determined using glassy carbon electrodes by a potentiogalvanometer. The results are shown in Table 2 below.

Examples 2 and 3

An electrolyte was prepared in the same manner as Example 1 except that ethyl N,N-dimethylcarbamate (Example 2) or methyl N,N-diethylcarbamate (Example 3) was used instead of methyl N,N-dimethylcarbamate. The electroconductivity and the withstand voltage of the resulted electrolytes ware determined. The results are shown in Table 2.

Comparative Example 1

An electrolyte was prepared in the same manner as Example 1 except that propylene carbonate was used instead of the mixed solvent. The electroconductivity and the withstand voltage of the resulted electrolyte were determined.

Comparative Example 2

An electrolyte was prepared in the same manner as Example 1 except that a mixed solvent comprising propylene carbonate and dimethoxyethane in a volume ratio of 1:1 was used instead of the mixed solvent. The electroconductivity and the withstand voltage of the resulted electrolyte were determined.

Comparative Example 3

An electrolyte was prepared in the same manner as Example 1 except that N-methyl-2-oxazolidinone was used instead of the mixed solvent. The electroconductivity and the withstand voltage of the resulted electrolyte were determined. The results of Comparative Examples 1 to 3 are also shown in Table 2.

TABLE 2

| No. | electro-conductivity (s*/cm) | withstand voltage (V) |
|---|---|---|
| example 1 | $1.21 \times 10^{-2}$ | 4.5 |

TABLE 2-continued

| No. | electro-conductivity (s*/cm) | withstand voltage (V) |
|---|---|---|
| example 2 | $0.85 \times 10^{-2}$ | 4.5 |
| example 3 | $0.64 \times 10^{-2}$ | 4.5 |
| comp. exam. 1 | $0.62 \times 10^{-2}$ | 5.1 |
| comp. exam. 2 | $1.5 \times 10^{-2}$ | 4.2 |
| comp. exam. 3 | $0.78 \times 10^{-2}$ | 3.8 |

*s: siemens

As seen from the results shown in Table 2, high withstand voltage and high electroconductivity as well were obtained in the examples of the present invention.

Example 4

A non-aqueous electrolyte cell of coin-like shape such as shown in FIG. 1 having a diameter of 20 mm and a height of 2.5 mm was manufactured. The cell had a negative electrode 1 of metal lithium and a positive electrode formed by pressure-molding of a mixture comprising 85 parts by weight of $LiCoO_2$, 12 parts by weight of graphite as a conductor and 3 parts by weight of fluorocarbon resin as a binder. The materials of the negative electrode 1 and positive electrode 2 were bonded to the negative electrode can 4 and positive electrode can 5 via porous separator 3. An electrolyte was prepared by dissolving lithium phosphate hexafluoride in a mixed solvent comprising trimethylcarbamate (TMC) i.e., methyl N,N-dimethylcarbamate and propylene carbonate (PC) in a volume ratio of 1:1 so that the electrolyte has a solute concentration of 1.0 mole/liter. The electrolyte was introduced into the cell from the sealing gasket 6 and sealed.

Thus manufactured cell was charged with a current of 1.0 mA and a maximum voltage of 4.1 V and then discharged with a current of 1.0 mA so that the cell showed a voltage of 3.0 V to determine the charge/discharge efficiency of the cell. Further, this charge/discharge cycle was repeated a given number of times to determine the change of the charge/discharge efficiency of the cell. The results were shown in FIG. 2, where the charge/discharge efficiency is plotted to the number of cycles (solid line). There is also plotted line (chain line) obtained in the same manner as above as to a comparative cell. It was manufactured in the same manner as Example 6 except that a mixed solvent of propylene carbonate and 1,2-dimethoxyethane (volume ratio=1:1) was used as the electrolyte solvent.

Figure 2:
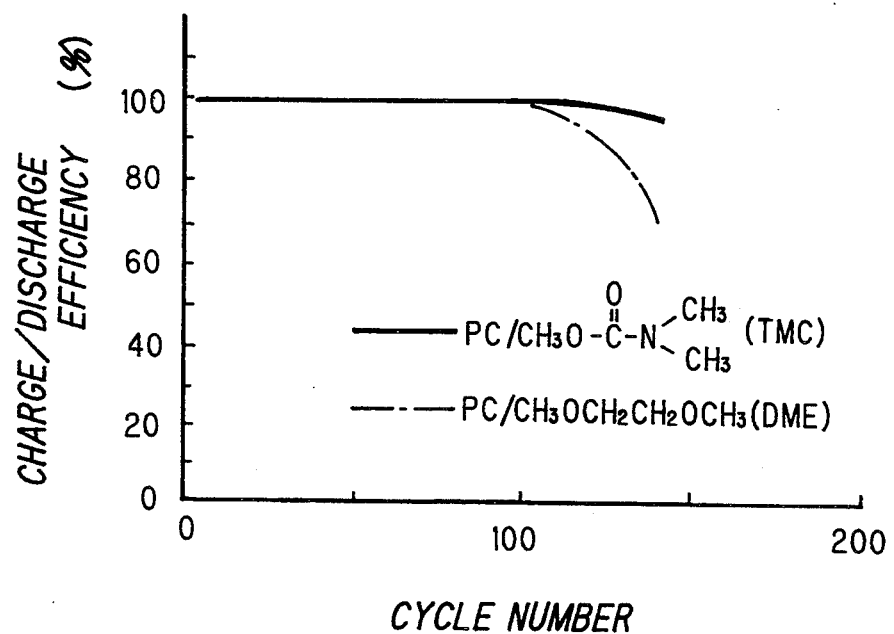
FIG. 2 is a graph showing the charge/discharge characteristics of the cell shown in FIG. 1.

As seen from results shown in FIG. 2, the cell utilizing the electrolyte solvent of the present invention maintained high charge/discharge efficiency even though it was subjected to a high voltage of more than 4 V and hence showed excellent cycle characteristics. These results demonstrate that the electrolyte of the present invention has high withstand voltage and excellent stability.

Examples 5 to 13 and Comparative Examples 4 to 7

The non-aqueous electrolyte battery of the present invention will be explained more specifically hereinafter.

Figure 3:
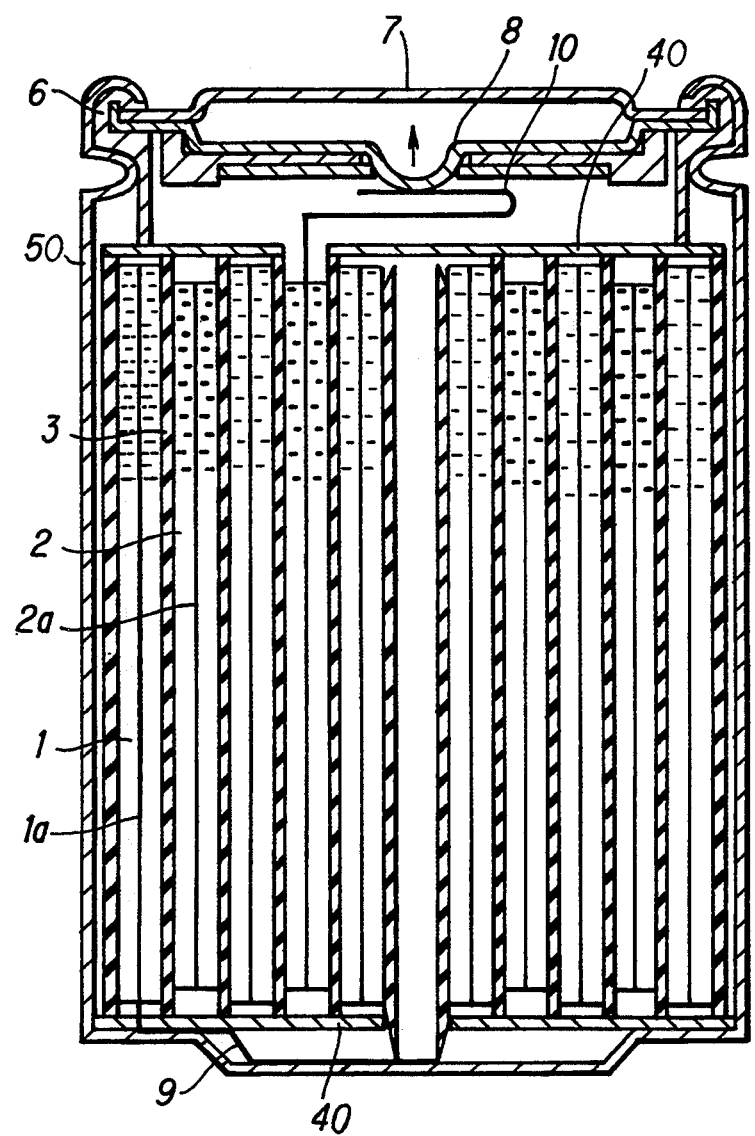
FIG. 3 is a sectional view of the cells manufactured in Examples 5 to 13 and Comparative Examples 4 to 7. The cells comprise a negative electrode 1, negative current collector 1a, positive electrode 2, positive current collector 2a, separator 3, insulator 4, cell housing can 5, sealing gasket 6, cell lid 7, current cut-off plate 8, negative electrode lead 9 and positive electrode lead 10.

FIG. 3 is a sectional view of the cell manufactured in Examples 5 to 13 according to the present invention and Comparative examples 4 to 7. The cell has a negative electrode strip 1 comprising a negative current collector 1a applied with negative acting material and a positive electrode strip 2 formed by applying positive acting material to a positive current collector 2a. The negative and positive electrode strips are stacked with a separator 3 interposed between the strips, and electrode strips and the separator are rolled into a cylindrical shape. Insulators 40 are placed on the both ends of the rolled electrodes and the electrodes are accommodated in a cell housing can 50. A sealing gasket 6 is placed on the peripheral part of the open end of the cell housing can 5, a cell lid 7 is placed on the rolled electrodes at the opening of the can 50 and the can 50 is caulked so that the lid 7 is secured to the can via the gasket and the cell is sealed up. The negative electrode 1 is connected to the bottom of the cell via a negative electrode lead 9, while the positive electrode 2 is connected to the lid 7 via a positive electrode lead 10 and a current cut-off thin plate 8. When the internal pressure of the cell heightens excessively, a current cut-off plate 8 is deformed as indicated by an arrow in FIG. 3 and it's connection to the positive electrode lead 10 is broken to cut off the current.

The cells of the above-described structure were manufactured as follows.

The negative electrode was prepared as follows. A non-graphitizable carbon, which was used as the active material of the negative electrode and has properties close to those of glassy carbon, was prepared by introducing 10 to 20% of functional groups containing oxygen into a starting material, petroleum pitch (oxygen crosslinking), and then sintering the pitch at 1000° C. in an inert gas flow. By X-ray diffraction analysis, it was found that the non-graphitizable carbon a distance between the (0 0 2) crystal faces of 3.76 A and a true specific gravity of 1.58 g/cm$^3$. This non-graphitizable carbon was pulverized to obtain carbonaceous powder having an average diameter of 10 μm. 90 parts by weight of the powder was mixed with 10 parts by weight of a binder, polyvinylidene fluoride (PVDF) to obtain a negative electrode mixture. Then the mixture was dispersed in N-methyl-2-pyrrolidone to give a slurry. The slurry was uniformly applied to the both surfaces of the negative current collector, a copper foil strip having a thickness of 10 μm and compression molded after drying to give the negative electrode strip 1.

The positive electrode was prepared as follows. As the positive acting material, $LiCoO_2$ was prepared by mixing lithium carbonate and cobalt carbonate in a molar ratio of 0.5:1 and sintering the resulted mixture in the ambient atmosphere at 900° C. for 5 hours. 91 parts by weight of the resulted $LiCoO_2$, 6 parts by weight of an electroconductive material, graphite, and 3 parts by weight of a binder, polyvinylidene fluoride (PVDF) were mixed to obtain a positive electrode mixture. Then the mixture was dispersed in N-methyl-2-pyrrolidone to give a slurry. The slurry was uniformly applied to the both surfaces of the positive current collector, an aluminum foil strip having a thickness of 20 μm and compression molded after drying to give the positive electrode strip 2.

Thus obtained positive electrode 2 and the negative electrode 1 were stacked interposing the separator 3 consisting of a microporous polypropylene film having a thickness of 25 μm between the electrodes, and the stacked electrodes were wound spirally many times to give a rolled body.

There was provided a steel can plated with nickel as the cell housing can 50, the insulator plate 40 was placed on the bottom of the can and then the rolled body was placed into the can. One end of a nickel negative electrode lead 9 was connected to the negative electrode 1 by contact bonding and the other end was welded to the cell housing can 50 to ensure the negative current collecting. Further, one end of an aluminum positive electrode lead 10 was connected to the positive electrode 2 and the other end of the lead was electrically connected to the cell lid 7 through a current cut-off plate 8, which can cut off the current depending on the internal pressure of the cell.

Then, a non-aqueous electrolyte formed by dissolving $LiPF_6$ in one of the solvents listed in Table 3 below at a concentration of 1 mole/liter was poured into the cell housing can 50. The insulating sealing gasket 6 applied with asphalt and the cell lid 7 were placed at the opening of the can 50 and the can 50 was caulked over the gasket 6 to fix the lid 7. Thus obtained cylindrical non-aqueous electrolyte cell had a diameter of 20 mm and a height of 50 mm.

Twenty cells for each of Examples 5 to 13 and Comparative Examples 4 to 7 were subjected to an overcharged state at 25° C. by using a current of 3.7 A and it was determined whether rapid temperature elevation or cell breakdown is observed. The results are also shown in Table 3.

As seen from the results shown in Table 3, cell breakdown was observed at a percentage of 100% in Comparative Examples 6 and 7 where the non-aqueous solvents did not contain the alkyl N,N-dialkylcarbamate. Further, in Comparative Example 4 where the non-aqueous solvent contained the alkyl N,N-dialkylcarbamate but in an amount of only 0.02% by volume, the cell breakdown was observed at a high percentage of 50%. In contrast, the cell breakdown was perfectly avoided in the working examples of the present invention. In addition, the cells of Comparative Example 5 where the non-aqueous solvent contained the alkyl N,N-dialkylcarbamate in an amount of more than 20% by volume showed rapid increase of the internal pressure of the cells when those cells were subjected to continuous charging at a high temperature of 60° C. and thus it was found that those cells were not preferred for practical applications. In all of the cells of Examples 5 to 13 according to the present invention where the solvent contained the alkyl N,N-dialkylcarbamates in an amount of from 0.05 to 20% by volume, perfectly prevented was the cell breakdown and excellent results was showed despite of the kind of the alkyl N,N-dialkylcarbamate.

TABLE 3

| No. | composition (vol %) of solvent of non-Aqueous electrolyte | | | occurrence of cell breakdown (%) |
|---|---|---|---|---|
| | PC | DEC | carbamate | |
| example 5 | 49.975 | 49.975 | 0.05 (*1) | 0 |
| example 6 | 49.95 | 49.95 | 0.1 (*1) | 0 |
| example 7 | 49.50 | 49.50 | 1.0 (*1) | 0 |
| example 8 | 45.0 | 45.0 | 10.0 (*1) | 0 |
| example 9 | 40.0 | 40.0 | 20.0 (*1) | 0 |
| example 10 | 49.95 | 49.95 | 0.1 (*2) | 0 |
| example 11 | 49.50 | 49.50 | 1.0 (*2) | 0 |
| example 12 | 49.95 | 49.95 | 0.1 (*3) | 0 |
| example 13 | 49.50 | 49.50 | 1.0 (*3) | 0 |
| comp. exam. 4 | 49.99 | 49.99 | 0.02 (*1) | 50 |
| comp. exam. 5 | 35 | 35 | 30 (*1) | 0 |
| comp. exam. 6 | 50 | 50 | — | 100 |
| comp. exam. 7 | 50 | 50 (*4) | — | 100 |

(*1) methyl N,N-dimethyl carbamate
(*2) ethyl N,N-dimethyl carbamate
(*3) ethyl N,N-diethyl carbamate
(*4) dipropyl carbonate As seen from the descriptions hereinbefore, by using an organic solvent containing the specific carbamates as an electrolyte solvent for non-aqueous electrolyte comprising an alkali metal dissolved in an electrolyte solvent according to the present invention, it becomes possible to improve both of electroconductivity and withstand voltage of the electrolyte. Therefore, by utilizing the electrolyte of the present invention in batteries, it is possible to obtain batteries having excellent withstand voltage and excellent charge/discharge efficiency. Further, because the electrolyte solvents of the present invention have a relatively high boiling point and a low melting point, they may be used in a wide temperature range. In addition, when the electrolyte solvents of the present invention are used in lithium cells, lithium cells stable to the lapse of time, that is, lithium cells having excellent cycle characteristics can be obtained, because the electrolytes are stable to metal lithium possibly deposited during the charge/discharge cycles.

According to the non-aqueous electrolyte battery of the present invention, an abnormal exothermic reaction caused by overcharging and rapid elevation of the temperature or the inner pressure of the battery are effectively avoided and hence breakdown of the battery is prevented.

What is claimed is:

1. A solvent for cell electrolyte comprising about 0.05 to 20% by volume, based on the total volume of the solvent, of a carbamate represented by the following formula (1)

wherein $R^1$, $R^2$ and $R^3$ independently represent a linear or branched alkyl group having 1 to 4 carbon atoms, and a cyclic carbonate represented by the following formula (2)

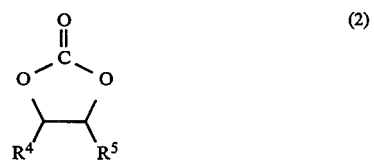

wherein $R^4$ and $R^5$ independently represent a substituent selected from the group consisting of a hydrogen atom, methyl group and ethyl group.

2. A solvent for cell electrolyte comprising a carbamate represented by the following formula (1)

wherein $R^1$, $R^2$, and $R^3$ independently represent a linear or branched alkyl group, wherein the amount of carbamate (1) is more than 0.02 and less than 30% by volume based on the total volume of the solvent, and a cyclic carbonate represented by the following formula (2)

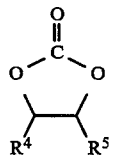

wherein $R^4$ and $R^5$ independently represent a substituent selected from the group consisting of a hydrogen atom, methyl group and ethyl group.

3. The solvent for cell electrolyte of claim 2, wherein the cyclic carbonate is one member selected from the group of ethylene carbonate, propylene carbonate and 2,3-butylene carbonate.

4. The solvent cell electrolyte of claim 2, wherein the volume ratio of the carbamate and the cyclic carbonate is in the range of from 1:9 to 8:2.

5. The solvent for cell electrolyte of claim 2 wherein $R^1$, $R^2$ and $R^3$ in the formula (1) independently represent a lower alkyl group having 1 to 4 carbon atoms.

6. The solvent for cell electrolyte of claim 2, wherein the carbamate is one member selected from the group of methyl, N,N-dimethylcarbamate, ethyl N,N-dimethylcarbamate, ethyl N,N-diethylcarbamate and propyl N,N-dimethylcarbamate.

7. A cell electrolyte comprising, as an electrolyte solvent, about 0.05 to 20% by volume based on the total volume of the solvent, a carbamate represented by the following formula (1)

wherein $R^1$, $R^2$ and $R^3$ independently represent a linear or branched alkyl group, and a cyclic carbonate represented by the following formula (2)

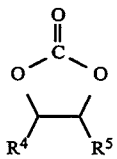

wherein $R^4$ and $R^5$ independently represent a substituent selected from the group consisting of a hydrogen atom, methyl group and ethyl group and an electrolyte.

8. A cell electrolyte comprising, as electrolyte solvents, a carbamate represented by the following formula (1)

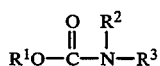

wherein $R^1$, $R^2$ and $R^3$ independently represent a linear or branched alkyl group, wherein the amount of carbamate (1) is more than 0.02 and less than 30% by volume based on the total volume of the solvent and a cyclic carbonate represented by the following formula (2)

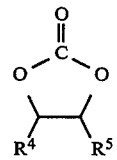

wherein $R^4$ and $R^5$ independently represent a substituent selected from the group consisting of a hydrogen atom, methyl group and ethyl group.

9. The cell electrolyte of claim 8 wherein the electrolyte comprises a solute electrolyte selected from the group consisting of $LiPF_6$, $LiBF_4$ and $LiClO_4$.

10. The cell electrolyte of claim 9 wherein the concentration of the solute electrolyte is from 0.1 mol/l to 3 mol/l.

11. A non-aqueous electrolyte battery comprising a negative electrode capable of being reversibly doped with lithium, a positive electrode and a non-aqueous electrolyte formed by dissolving a solute electrolyte in a non-aqueous solvent, wherein the non-aqueous solvent comprises one or more carbamates represented by the following formula;

wherein $R^1$, $R^2$ and $R^3$ independently represent a linear or branched alkyl group.

12. The non-aqueous electrolyte battery of claim 11 wherein the non-aqueous solvent comprises the carbamates in an amount of from 0.05 to 20% by volume of the total volume of the non-aqueous solvent.

13. The non-aqueous electrolyte battery of claim 11 wherein the non-aqueous solvent comprises at least one carbonate solvent compound.

14. A non-aqueous electrolyte battery of claim 11 wherein the positive electrode comprises $Li_xMO_2$ wherein M represents at least one transition metal and x satisfied $0.05 \leq x \leq 1.10$.

15. A non-aqueous solvent for cell electrolyte comprising a carbamate represented by the following formula (1):

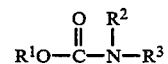

wherein $R^1$, $R^2$ and $R^3$ independently represent a linear or branched alkyl group, and a cyclic carbonate represented by the following formula (2):

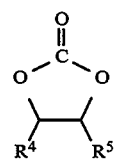

wherein $R^4$ and $R^5$ independently represent a substituent selected from the group consisting of a hydrogen atom, methyl group and ethyl group,
wherein the amount of the carbamate (1) is about 0.05 to 20% by volume based on the total volume of the solvent.

16. The solvent for cell electrolyte of claim 15 wherein the volume ratio of the carbamate and the cyclic carbonate is in the range of from 1:9 to 8:2.

17. A cell electrolyte comprising:
solvent consisting essentially of a carbamate represented by the following formula (1):

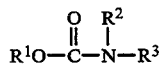 (1)

wherein $R^1$, $R^2$ and $R^3$ independently represent a linear or branched alkyl group, wherein the amount of carbamate is about 0.05 to 20% by volume based on the total volume of the solvent, and a cyclic carbonate represented by the following formula (2)

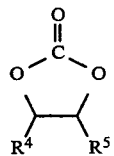 (2)

wherein $R^4$ and $R^5$ independently represent a substituent selected from the group consisting of a hydrogen atom, methyl group and ethyl group, and
a solute electrolyte selected from the group consisting of $LiPF_6$, $LiBF_4$ and $LiClO_4$,
wherein the concentration of the solute electrolyte is from 0.1 mol/l to 3 mol/l.

18. A secondary cell electrolyte non-aqueous solvent comprising a carbamate represented by the following formula (1):

 (1)

wherein $R^1$, $R^2$ and $R^3$ independently represent a linear or branched alkyl group, wherein the amount of the carbamate (1) is more than 0.02 and less than 30% by volume based on the total volume of the solvent, and a cyclic carbonate represented by the following formula (2):

 (2)

wherein $R^4$ and $R^5$ independently represent a substituent selected from the group consisting of a hydrogen atom, methyl group and ethyl group.

19. A secondary cell electrolyte comprising:
a non-aqueous solvent consisting essentially of a carbamate represented by the following formula (1):

 (1)

wherein $R^1$, $R^2$ and $R^3$ independently represent a linear or branched alkyl group, wherein the amount of carbamate (1) is more than 0.02 and less than 30% by volume based on the total volume of the solvent, and a cyclic carbonate represented by the following formula (2):

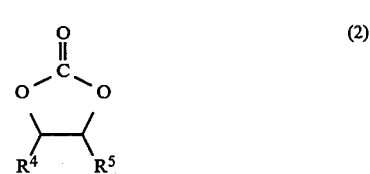 (2)

wherein $R^4$ and $R^5$ independently represent a substituent selected from the group consisting of a hydrogen atom, methyl group and ethyl group, and a solute electrolyte selected from the group consisting of $LiPF_6$, $LiBF_4$ and $LiClO_4$,
wherein the concentration of the solute electrolyte is from 0.1 mol/l to 3 mol/l.

* * * * *